Dec. 1, 1959  J. H. HAMMOND, JR., ET AL  2,915,405
FROZEN FOOD INDICATOR
Filed March 17, 1958

INVENTORS
JOHN HAYS HAMMOND JR.
EMORY LEON CHAFFEE

BY

ATTORNEY

United States Patent Office 2,915,405
Patented Dec. 1, 1959

2,915,405

FROZEN FOOD INDICATOR

John Hays Hammond, Jr., Gloucester, and Emory Leon Chaffee, Belmont, Mass.; said Chaffee assignor to said Hammond, Jr.

Application March 17, 1958, Serial No. 721,986

1 Claim. (Cl. 99—192)

This invention is related to thermal indicators and more particularly to indicators for packaged frozen substances such as food whereby the amount of defrosting is shown.

The object of the invention is to provide an inexpensive tell-tale device, to be inserted in the package of a substance before freezing which is activated by the freezing process and indicates the extent of any subsequent defrosting of the substance.

A further object of the invention is to provide an indicator which cannot be reset after defrosting has occurred.

There are many substances such as foods, blood plasma, serums, and vaccines which are preserved for long periods in good condition provided the temperature is maintained below some particular value which may be different for different substances. For example, quickly frozen foods remain palatable and wholesome if maintained below 10° F. On the other hand, ice cream may be preserved in good condition if the temperature does not rise above 32° F.

If during the distribution of food or other substances, the temperature of the food or other substance rises much above the particular temperature for best preservation, the substance may become inferior in quality or be spoiled.

It is important to know whether or not the substance such as food has, through accident or neglect, been allowed to thaw for a time and then been refrozen. If the period of thawing has been short the only effect, if any, may be to render the food less palatable because of the formation of large ice crystals and the consequent breaking of the fibres of the food. The food may still be saleable if the period of thawing is short. If the temporary thawing is repeated or if a single thawing is prolonged the food rapidly deteriorates and a prolonged exposure to thawing temperatures may result in bacterial growth in the food and possible serious food poisoning of those who eat the food.

The purchaser of frozen food packages ordinarily has no way of telling whether the food has been well preserved or is poor in quality or even dangerous to eat. Various tell-tale devices have been proposed to indicate if the package has been allowed to thaw but all devices thus far proposed, so far as we are aware, have objectionable features. Most of them are too rapid in action and give a danger signal for only temporary surface thawing of the packages which would not necessarily make the food unwholesome. Other devices are too complicated and too expensive. None of the devices known to us gives an indication dependent upon the amount of damaging exposure to heat.

The present invention provides a simple, inexpensive, and easily applied tell-tale device which does not indicate danger for a very short temperature rise permitting only slight surface thawing, but does indicate when the thawing is sufficiently long to cause damage. It also indicates when the substance has been repeatedly thawed for short intervals. Furthermore, the indicator may be made to respond when the temperature rises for a significant period above any assigned value, as for example 10° or 32° F.

The invention also consists in certain new and original features of construction and combinations of parts hereinafter set forth and claimed.

Like reference characters denote like parts in the several figures of the drawing.

In the following description parts will be identified by specific names for convenience, but they are intended to be generic in their application to similar parts.

Figure 1:
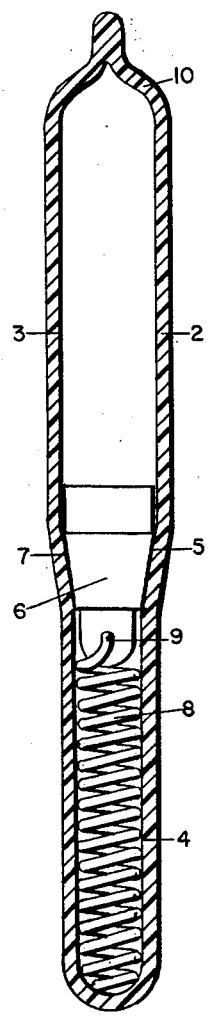
Fig. 1 is a view of the indicator before defrosting of the substance has occurred.

Referring to Fig. 1, an envelope 2, made of some transparent substance such as a plastic, comprises two cylindrical sections 3 and 4 of different internal diameters. These sections 3 and 4 are connected by a third section 5 having an internal diameter which varies uniformly from that of section 3 to that of section 4. The envelope is closed at one end of the smaller section 4. Section 3 of envelope 2 is left open during manufacture but is sealed closed in the finished form as will be explained later.

A plug 6 made of some opaque substance such as plastic can move freely along section 3 and has a tapered portion 7 which fits snugly into the similarly tapered section 5 of envelope 2.

A coiled spring 8 is attached at one end 9 to plug 6. The spring is normally extended as in Fig. 2 but when compressed as in Fig. 1 exerts a force tending to move plug 6 along the larger section 3 of envelope 2.

Figure 2:
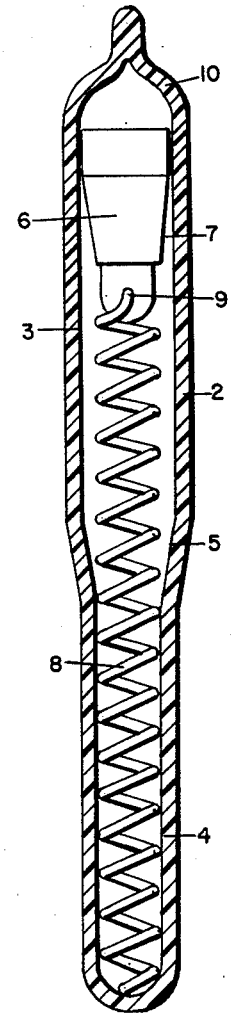
Fig. 2 is a view of the indicator showing defrosting.

The mode of operation of the invention is as follows. During the manufacture of the indicator, end 10 of the larger section 3 of envelope 2 is left open. A liquid such as water, or water with dissolved chemical, having a suitable freezing temperature, is placed in envelope 2 completely filling sections 4 and 5. After inserting the spring and attached plug 6, a rod, not shown, is inserted into the open end of envelope 2 to force plug 6 firmly into its seat in section 5 where plug 6 is held by friction against the pressure of spring 8. The rod is then withdrawn and end 10 is sealed as shown in Figs. 1 and 2. The indicator is thus set and can be preserved in this condition for future use so long as its temperature does not vary greatly from the temperature prevailing during manufacture.

When the indicator is enclosed in a package of substance such, for example, as food and then frozen, the expansion of the water solution at freezing releases the plug from its seat in section 5, but the ice formed by freezing entraps the spring 8 so that plug 6 is retained in approximately its original set position.

If defrosting of the package including the indicator occurs the ice in section 4 progressively melts allowing the spring 8 to push plug 6 along section 3 a distance dependent upon the time of defrosting. If refreezing occurs after a brief defrosting the spring 8 is again entrapped after plug 6 has moved but a short distance along section 3 depending upon the time of the original defrosting. Thus the distance through which plug 6 moves is roughly proportional to the total integrated time of defrosting, whether such defrosting has taken place in several short periods or in one longer period. The arrival of the plug 6 at the end 10 of section 3 would indicate an amount of defrosting which would be injurious to the contents of the package.

The plug cannot be reset except by opening the envelope 2.

Although only a few of the various forms in which this invention may be embodied have been shown herein, it is to be understood that the invention is not limited to any specific construction but may be embodied in various forms without departing from the spirit of the invention.

What is claimed is:

An indicator for frozen food packages comprising an elongated transparent container adapted to be embedded in said package and having two sections of different internal diameters forming larger and smaller sections joined by a conical section, a piston slidable in said larger section and having a conical surface to fit tightly in said conical section, a spring in said smaller section biased to exert a force to advance said piston from said conical section along said larger section, and a mass of liquid filling said smaller section and having a freezing point approximately that of said food and which expands upon freezing to release said piston from its seat in said conical section and is adapted to confine said spring when frozen, whereby upon becoming unfrozen the spring is released to advance said piston.

References Cited in the file of this patent

UNITED STATES PATENTS 2,788,282     Hammond _____ Apr. 9, 1957